United States Patent
Hsieh et al.

(10) Patent No.: US 7,970,343 B2
(45) Date of Patent: Jun. 28, 2011

(54) METHOD, WIRELESS COMMUNICATION SYSTEM, TANGIBLE MACHINE-READABLE MEDIUM, AND COMMUNICATION APPARATUS FOR TRANSMITTING AND RELAYING CHANNEL DESCRIPTOR BASED ON A MULTI-HOP RELAY STANDARD

(75) Inventors: Chih-Chiang Hsieh, Jen-Wu Township, Kaohsiung County (TW); Shiann-Tsong Sheu, Taipei (TW); Hua-Chiang Yin, Guei-Shan Township, Taoyuan County (TW); Youn-Tai Lee, Yung-Ho (TW); Kan-chei Loa, Taipei (TW); Yung-Ting Lee, Taipei (TW); Yi-Hsueh Tsai, Ban-Chiao (TW); Frank Chee-Da Tsai, Taipei (TW); Heng-Iang Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 779 days.

(21) Appl. No.: 11/951,134

(22) Filed: Dec. 5, 2007

(65) Prior Publication Data

US 2008/0214106 A1 Sep. 4, 2008

Related U.S. Application Data

(60) Provisional application No. 60/892,724, filed on Mar. 2, 2007.

(51) Int. Cl.
H04B 7/14 (2006.01)
(52) U.S. Cl. .......... 455/7; 455/452.1; 455/458; 455/464
(58) Field of Classification Search .................. 455/450, 455/452.1, 452.2, 454, 455, 458, 464, 509, 455/515, 7, 11.1; 370/337, 442, 335
See application file for complete search history.

(56) References Cited

U.S. PATENT DOCUMENTS

| | | | | |
|---|---|---|---|---|
| 5,982,761 A | * | 11/1999 | Dutta | 370/337 |
| 6,459,703 B1 | * | 10/2002 | Grimwood et al. | 370/442 |
| 2007/0274265 A1 | * | 11/2007 | Yoon et al. | 370/335 |

* cited by examiner

Primary Examiner — John Lee
(74) Attorney, Agent, or Firm — Patterson Thuente Christensen Pedersen, P.A.

(57) ABSTRACT

A method, a wireless communication system, a tangible machine-readable medium, and a communication apparatus for transmitting and relaying a channel descriptor based on a multi-hop relay standard are provided. The wireless communication system comprises a BS and at least one RS. The BS divides the channel descriptor into a common channel descriptor and at least one particular channel descriptor. Then the BS broadcasts/multicasts the common channel descriptor to the at least one RS and transmits the at least one particular channel descriptor to the same. The at least one RS combines the common channel descriptor and the at least one particular channel descriptor to generate the channel descriptor.

22 Claims, 15 Drawing Sheets

METHOD, WIRELESS COMMUNICATION SYSTEM, TANGIBLE MACHINE-READABLE MEDIUM, AND COMMUNICATION APPARATUS FOR TRANSMITTING AND RELAYING CHANNEL DESCRIPTOR BASED ON A MULTI-HOP RELAY STANDARD

CROSS-REFERENCES TO RELATED APPLICATIONS

This application claims the benefit of Provisional Application Ser. No. 60/892,724 filed on Mar. 2, 2007.

BACKGROUND OF THE INVENTION

1. Field of the Invention

The present invention relates to a method, a wireless communication system, a tangible machine-readable medium, and a communication apparatus for transmitting and relaying a channel descriptor based on a multi-hop relay standard; more specifically, relates to a method, a wireless communication system, a tangible machine-readable medium, and a communication apparatus for transmitting and relaying a downlink channel descriptor (DCD) and/or an up link channel descriptor (UCD) based on a multi-hop relay standard.

2. Descriptions of the Related Art

Although IEEE 802.16 standard already provides greater bandwidths, lower building cost, better service quality and expansibility, there still exist some defects of coverage and signal quality of IEEE 802.16 standard. Therefore, IEEE 802.16j standard working group established a multi-hop relay study group in July 2005 for building a multi-hop relay standard.

When a base station (BS) of IEEE 802.16 standard broadcasts/multicasts a channel descriptor, such as a DCD or a UCD, the channel descriptor just can be transmitted to mobile stations (MSs) or subscriber stations (SSs), and the channel descriptor can not be relayed either by relay stations (RSs). Accordingly, a solution to transmitting and relaying DCDs and/or UCDs based on a multi-hop relay standard, such as IEEE 802.16j standard, is desired.

SUMMARY OF THE INVENTION

One objective of this invention is to provide a method for transmitting a channel descriptor based on a multi-hop relay standard. The method comprises the following steps: dividing the channel descriptor into a common channel descriptor and at least one particular channel descriptor; transmitting the common channel descriptor from a BS to at least one RS; and transmitting the at least one particular channel descriptor from the BS to the at least one RS.

Another objective of this invention is to provide a wireless communication system for transmitting a channel descriptor based on a multi-hop relay standard. The wireless communication system comprises a BS and at least one RS. The BS divides the channel descriptor into a common channel descriptor and at least one particular channel descriptor. Then the BS transmitting the common channel descriptor to the at least one RS and transmits the at least one particular channel descriptor to the same.

Another objective of this invention is to provide a tangible machine-readable medium having executable code to cause a machine to perform a method for transmitting a channel descriptor based on a multi-hop relay standard. The method comprises the following steps: dividing the channel descriptor into a common channel descriptor and at least one particular channel descriptor; transmitting the common channel descriptor from a BS to at least one RS; and transmitting the at least one particular channel descriptor from the BS to the at least one RS.

Another objective of this invention is to provide a communication apparatus for transmitting a channel descriptor based on a multi-hop relay standard. The communication apparatus comprises a divider and a transmitting module. The divider divides the channel descriptor into a common channel descriptor and a particular channel descriptor. The transmitting module transmits the common channel descriptor to at least one RS and transmits the particular channel descriptor to the same.

Yet a further objective of this invention is to provide another communication apparatus for relaying a channel descriptor based on a multi-hop relay standard. The communication apparatus comprises a receiving module, a processor, and a transmitting module. The receiving module receives a common channel descriptor and a particular channel descriptor from a BS. The processor combines the common channel descriptor and the particular channel descriptor to generate the channel descriptor. The transmitting module transmits the channel descriptor to one of at least one RS and at least one MS.

The aforesaid method can be executed by wireless communication apparatus, such as a BS or an RS in the wireless communication system. By dividing a channel descriptor into a common channel descriptor and at least one particular channel descriptor, transmitting the common channel descriptor to a plurality of RSs, and transmitting the at least one particular channel descriptor to one of the RSs, this invention can transmit and relay the channel descriptor to each MS of the wireless communication system based on a multi-hop relay standard.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
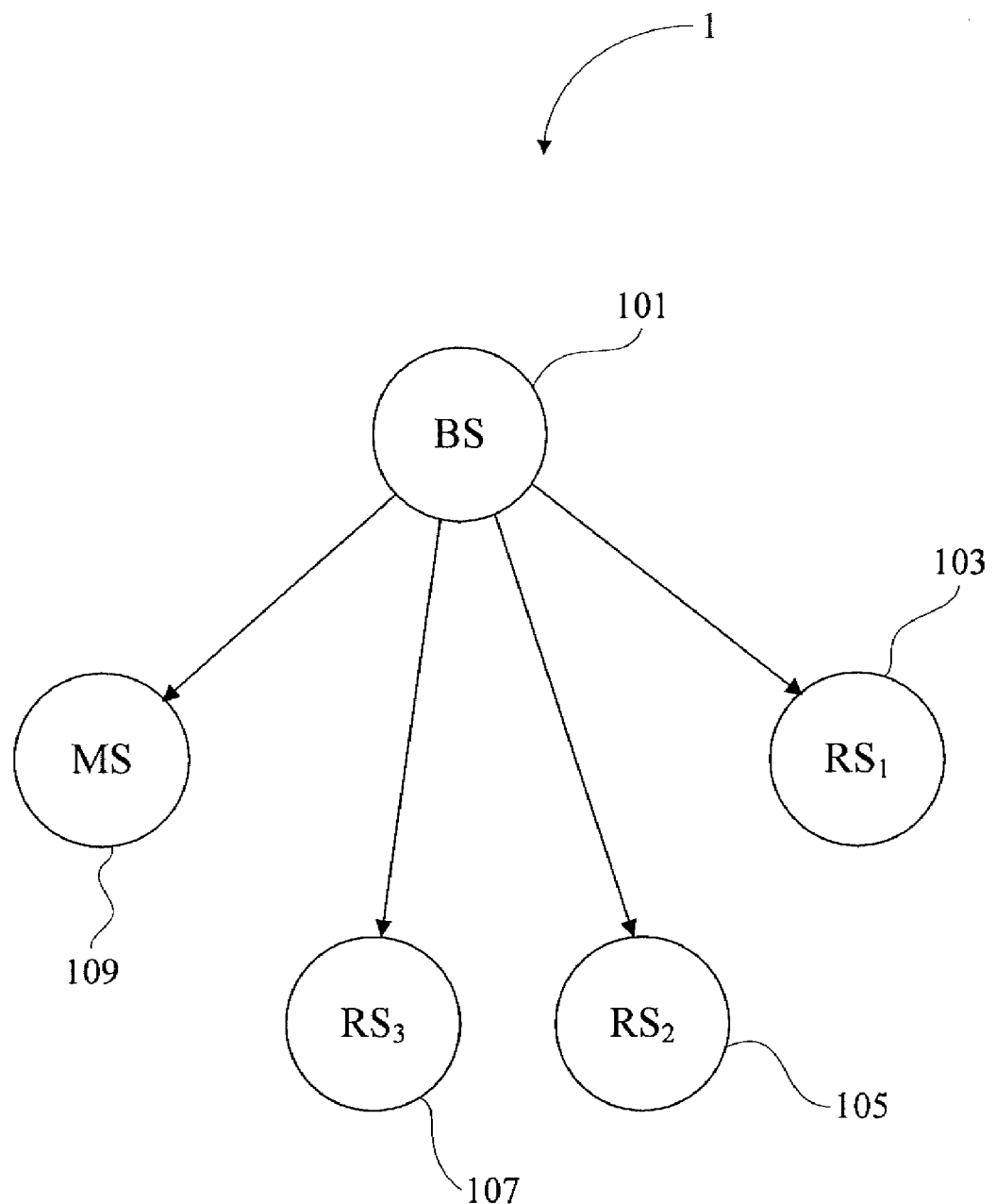
FIG. 1 illustrates a block diagram of a first embodiment of the present invention.
Figure 2:
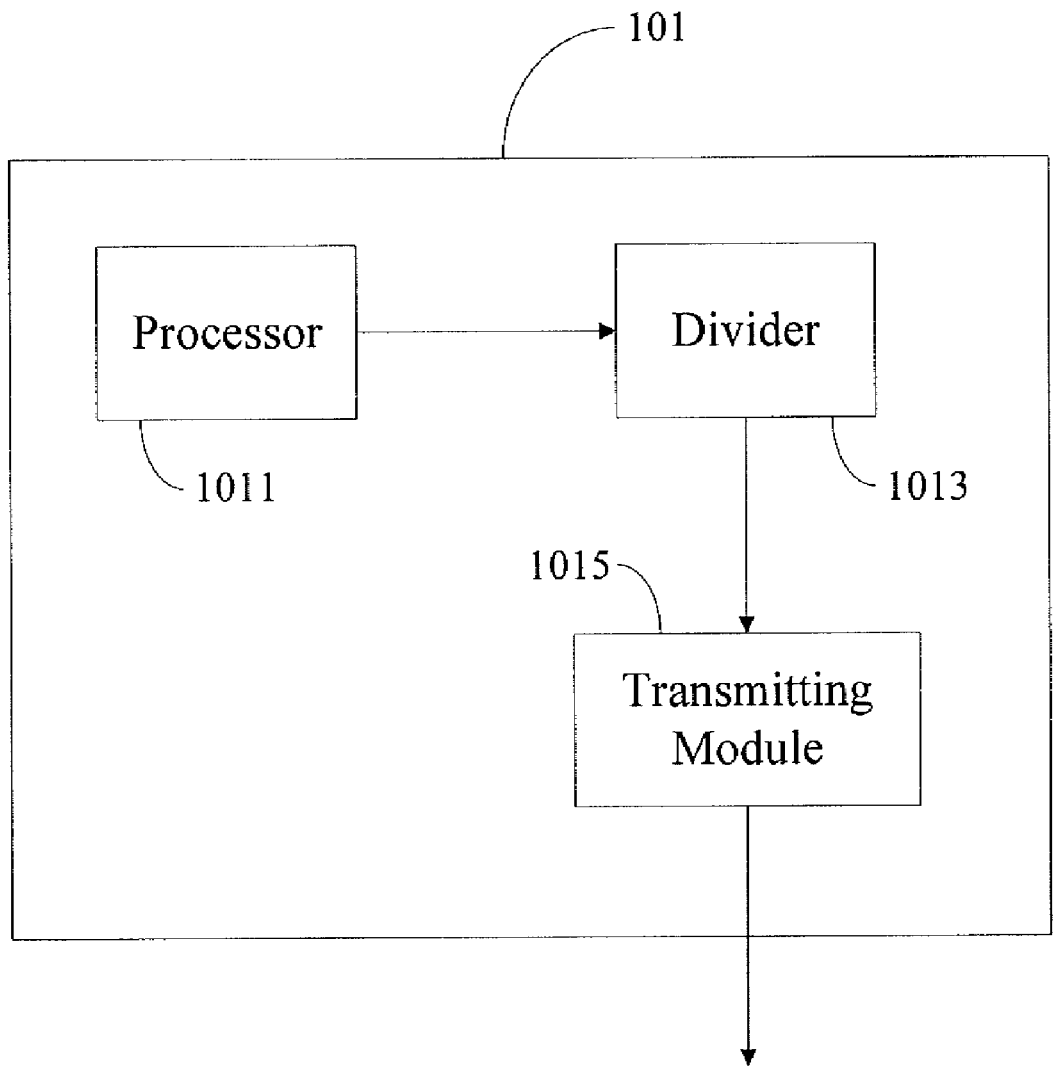
FIG. 2 illustrates a block diagram of a BS of the first embodiment.

As illustrated in FIG. 1, a first embodiment of the present invention is a two-hop relay station system 1 based on a multi-hop relay standard, such as IEEE 802.16j standard. The two-hop relay station system 1 comprises a BS 101, a plurality of RSs 103, 105, 107, and a MS 109. For the sake of simplification, three RSs ($RS_1$ 103, $RS_2$ 105, and $RS_3$ 107) are illustrated. The BS 101 of the two-hop relay station system 1 is illustrated in FIG. 2, which comprises a processor 1011, a divider 1013, and a transmitting module 1015. And some types of the transmitting of channel descriptors of the two-hop relay station system 1 are illustrated in FIG. 3 to FIG. 7. The channel descriptors can be DCDs, UCDs, or combinations of the DCDs and the UCDs.

Figure 3:
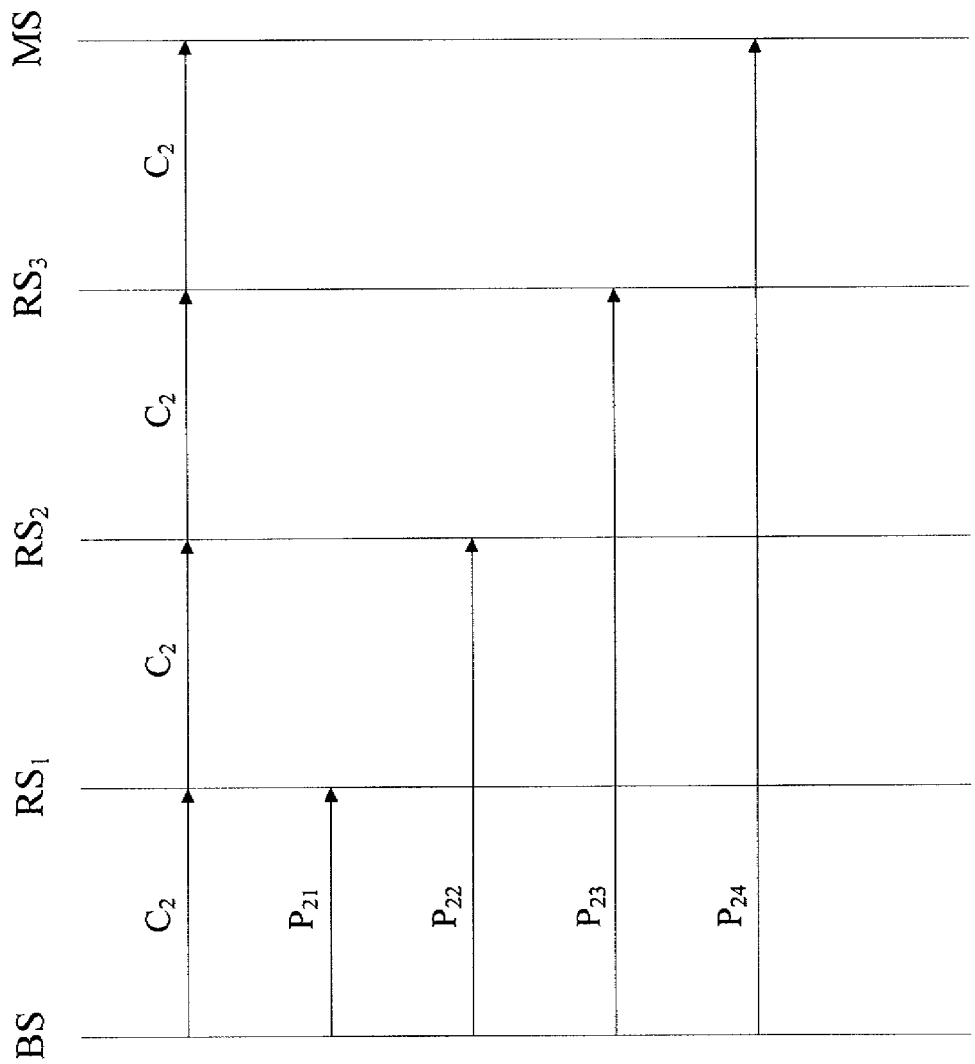
FIG. 3~FIG. 7 are diagrams of transmitting common channel descriptor and particular channel descriptors of the first embodiment.
Figure 4:
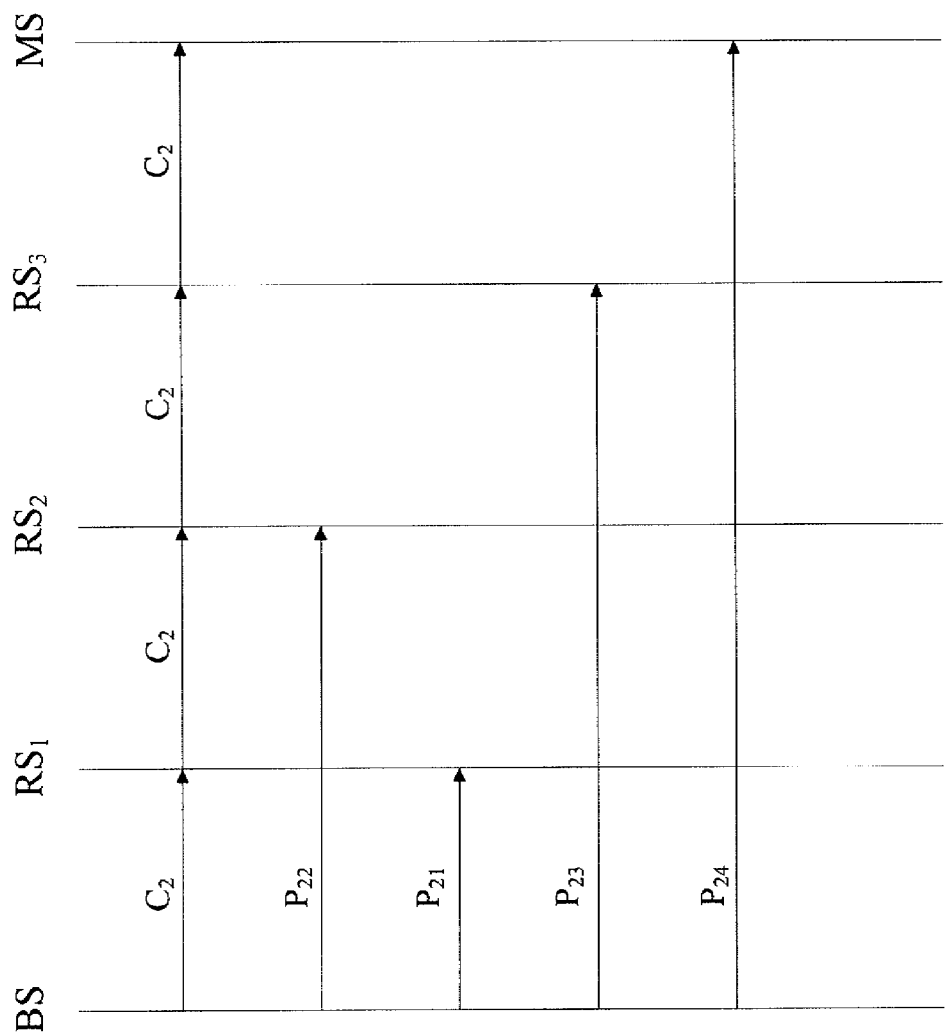

In FIG. 3 and FIG. 4, the processor 1011 of the BS 101 finds the same information of the channel descriptors of the $RS_1$ 103, the $RS_2$ 105, the $RS_3$ 107, and the MS 109 first. The channel descriptor of the $RS_1$ 103 is divided into a common channel descriptor $C_2$ and a particular channel descriptor $P_{21}$ of the $RS_1$ by the divider 1013 of the BS 101 according to the same information. The channel descriptor of the $RS_2$ 105 is divided into a common channel descriptor $C_2$ and a particular channel descriptor $P_{22}$ of the $RS_2$ 105 by the divider 1013 of the BS 101 according to the same information. The channel descriptor of the $RS_3$ 107 is divided into a common channel descriptor $C_2$ and a particular channel descriptor $P_{23}$ of the $RS_3$ 107 by the divider 1013 of the BS 101 according to the same information. The channel descriptor of the MS 109 is divided into a common channel descriptor $C_2$ and a particular channel descriptor $P_{24}$ of the MS 109 by the divider 1013 of the BS 101 according to the same information.

The common channel descriptors $C_2$ of the $RS_1$ 103, the $RS_2$ 105, the $RS_3$ 107, and the MS 109 are the same, so that the transmitting module 1015 of the BS 101 can transmit (i.e. broadcast/multicast) the common channel descriptor only once to save the radio source. After that, the particular channel descriptor $P_2$, of the $RS_1$ 103 will be transmitted to the $RS_1$ 103, the particular channel descriptor $P_{22}$ of the $RS_2$ 105 will be transmitted to the $RS_2$ 105, the particular channel descriptor $P_{23}$ of the $RS_3$ 107 will be transmitted to the $RS_3$ 107, and the particular channel descriptor $P_{24}$ of the MS 109 will be transmitted to the MS 109 by the transmitting module 1015 of the BS 101. And the sequence of separately transmitting the particular channel descriptors ($P_{21}$, $P_{22}$, $P_{23}$, and $P_{24}$) of the RSs is variable. In other words, the particular channel descriptor $P_{23}$ of the $RS_3$ 107 can be transmitted before the particular channel descriptor $P_{24}$ of the MS 109 or the particular channel descriptor $P_{24}$ Of the MS 109 can be transmitted before the particular channel descriptor $P_{21}$ of the $RS_1$ 103, etc.

Figure 5:
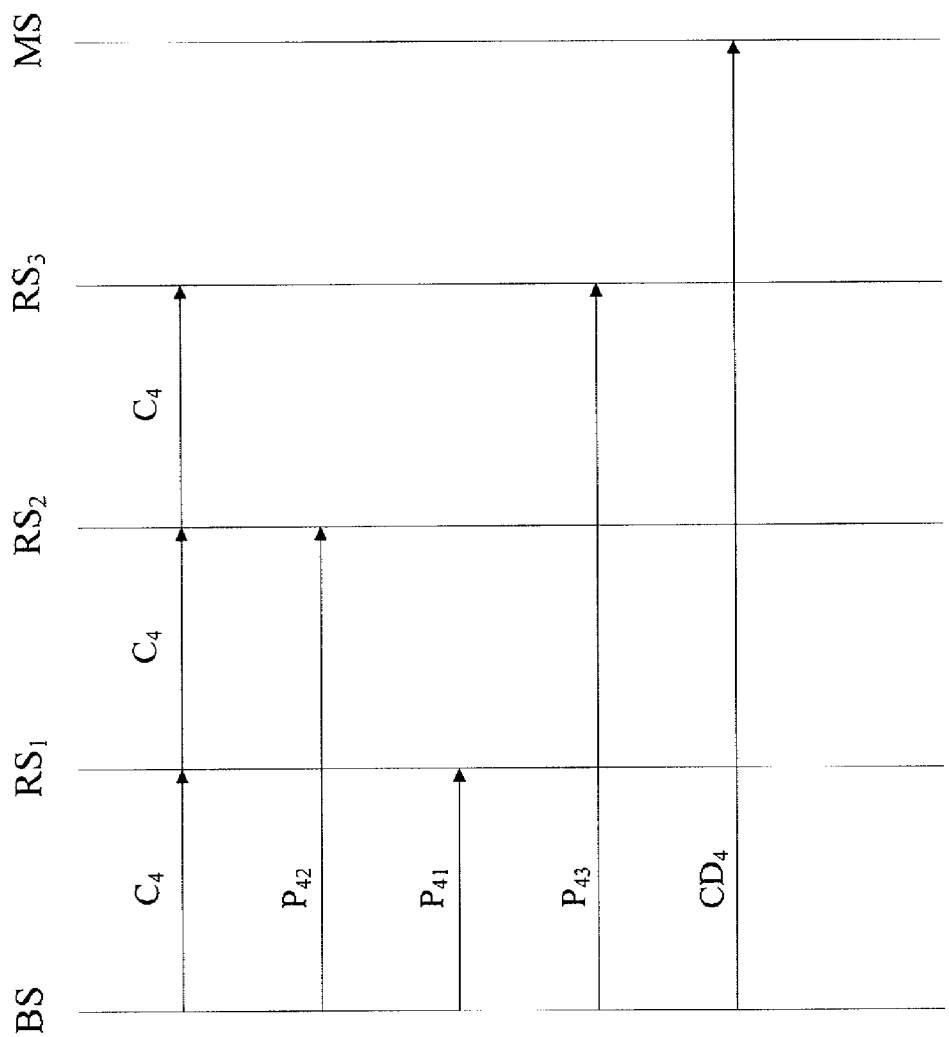

In FIG. 5, the processor 1011 of the BS 101 finds the same information of the channel descriptors of the $RS_1$ 103, the $RS_2$ 105, the $RS_3$ 107, and the MS 109 first. If no same information exists among the channel descriptors of the $RS_1$ 103, the $RS_2$ 105, the $RS_3$ 107, and the MS 109, the processor 1011 of the BS 101 will find the greatest amount of the same information among parts of the RSs 103, 105, 107, 109. In this example, there exists same information among the channel descriptors of the $RS_1$ 103, the $RS_2$ 105, and the $RS_3$ 107. Consequently, the channel descriptor of the $RS_1$ 103 is divided into a common channel descriptor $C_4$ and a particular channel descriptor $P_{41}$ of the $RS_1$ 103 by the divider 1013 of the BS 101 according to the same information. The channel descriptor of the $RS_2$ 105 is divided into a common channel descriptor $C_4$ and a particular channel descriptor $P_{42}$ of the $RS_2$ 105 by the divider 1013 of the BS 101 according to the same information. The channel descriptor of the $RS_3$ 107 is divided into a common channel descriptor $C_4$ and a particular channel descriptor $P_{43}$ of the $RS_3$ 107 by the divider 1013 of the BS 101 according to the same information. And in this example, a channel descriptor $CD_4$ of the MS 109 is not divided.

The common channel descriptors of the $RS_1$ 103, the $RS_2$ 105, and the $RS_3$ 107 are the same, so that the transmitting module 1015 of the BS 101 can broadcast/multicast the common channel descriptor $C_4$ only once to save the radio source. After that, the particular channel descriptor $P_{41}$ of the $RS_1$ 103 will be transmitted to the $RS_1$ 103, the particular channel descriptor $P_{42}$ of the $RS_2$ 105 will be transmitted to the $RS_2$ 105, and the particular channel descriptor $P_{43}$ of the $RS_3$ 107 will be transmitted to the $RS_3$ 107 by the transmitting module 1015 of the BS 101. And the sequence of separately transmitting the particular channel descriptors ($P_{41}$, $P_{42}$, and $P_{43}$) of the $RS_1$ 103, the $RS_2$ 105, and the $RS_3$ 107, respectively, is variable. Finally, the channel descriptor $CD_4$ of the MS 109 is transmitted to the MS 109 by the transmitting module 1015 of the BS 101 directly.

Figure 6:
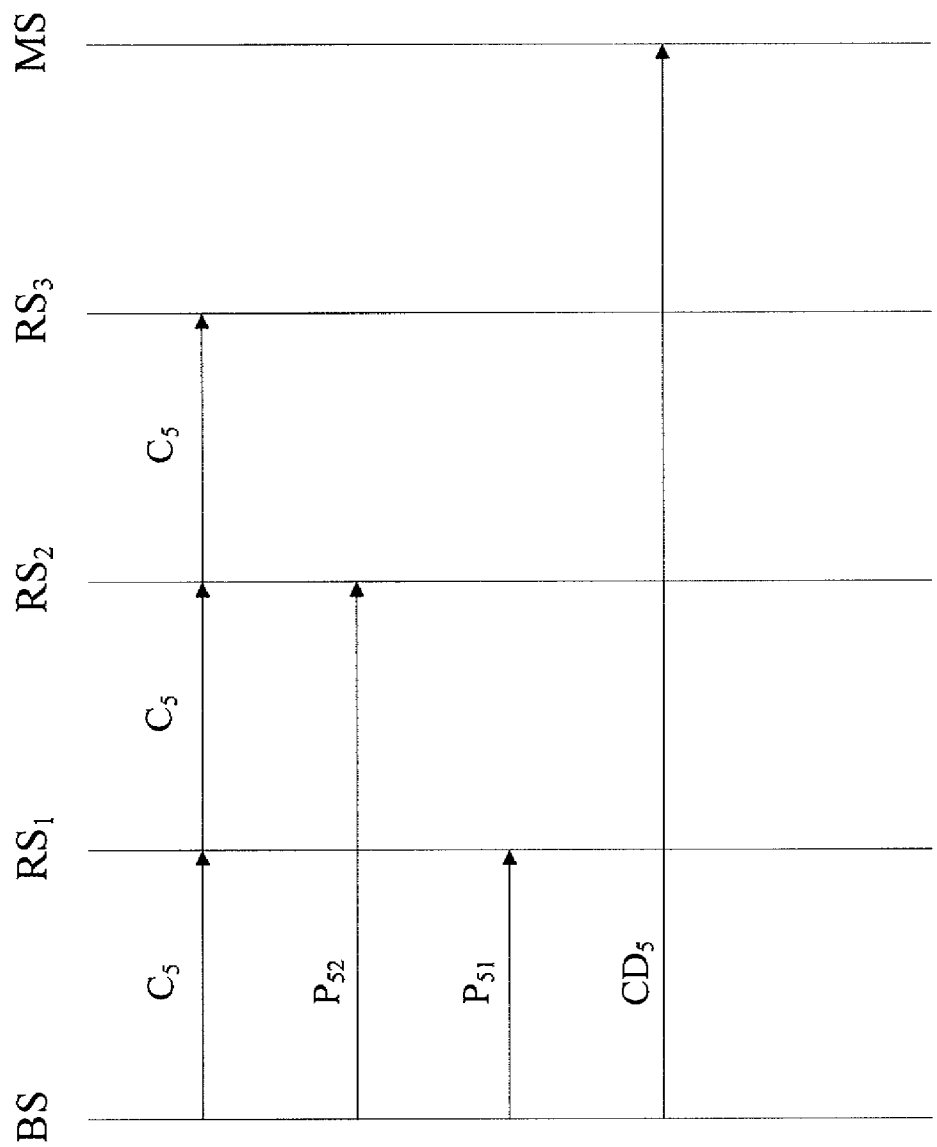

In FIG. 6, the BS 101 executes the same operation as those described in FIG. 5, so that the channel descriptor of the $RS_1$ 103 is divided into a common channel descriptor $C_5$ and a particular channel descriptor $P_{51}$ of the $RS_1$ 103 by the divider 1013 of the BS 101 according to the same information of $RS_1$ 103, $RS_2$ 105, and $RS_3$ 107. The channel descriptor of the $RS_2$ 105 is divided into a common channel descriptor $C_5$ and a particular channel descriptor $P_{52}$ of the $RS_2$ 105 by the divider 1013 of the BS 101 according to the same information of $RS_1$ 103, $RS_2$ 105, and $RS_3$ 107. The channel descriptor of the $RS_3$ 107 is divided into a common channel descriptor $C_5$ of the $RS_3$ 107, but no particular channel descriptor of the $RS_3$ 107 by the divider 1013 of the BS 101 according to the same information of $RS_1$ 103, $RS_2$ 105, and $RS_3$ 107. It means that the channel descriptor of the $RS_3$ 107 is the common channel descriptor of the $RS_3$ 107. And in this example, a channel descriptor $CD_5$ of the MS 109 is not divided.

The common channel descriptors of the $RS_1$ 103, the $RS_2$ 105, and the $RS_3$ 107 are the same, so that the transmitting module 1015 of the BS 101 can broadcast/multicast the common channel descriptor only once to save the radio source. After that, the particular channel descriptor $P_{51}$ of the $RS_1$ 103 will be transmitted to the $RS_1$ 103 and the particular channel descriptor $P_{52}$ of the $RS_2$ 105 will be transmitted to the $RS_2$ 105 by the transmitting module 1015 of the BS 101. Because the channel descriptor of the $RS_3$ 107 is the common channel descriptor, there is no particular channel descriptor of the $RS_3$ 107 which needs to be transmitted. Finally, the channel descriptor $CD_5$ of the MS 109 is transmitted to the MS 109 by the transmitting module 1015 of the BS 101 directly.

Figure 7:
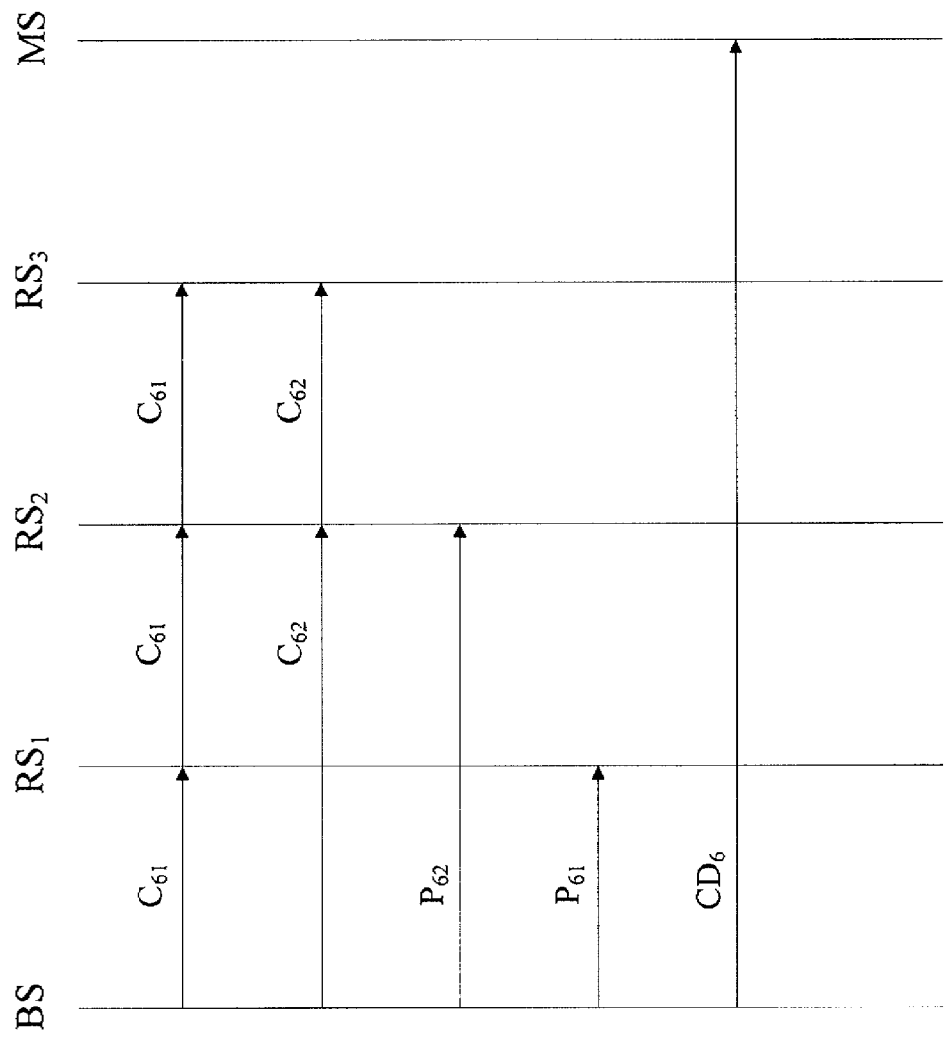

In FIG. 7, the BS 101 executes the same operation as those described in FIG. 5, so that the channel descriptor of the $RS_1$ 103 is divided into a first common channel descriptor $C_{61}$ and a particular channel descriptor $P_{61}$ of the $RS_1$ 103 by the divider 1013 of the BS 101. The channel descriptor of the $RS_2$ 105 is divided into a first common channel descriptor $C_{61}$, a second common channel descriptor $C_{62}$, and a particular channel descriptor $P_{62}$ of the $RS_2$ 105 by the divider 1013 of the BS 101. The channel descriptor of the $RS_3$ 107 is divided into a first common channel descriptor $C_{61}$ and a second common channel descriptor $C_{62}$, but no particular channel descriptor of the $RS_3$ 107 by the divider 1013 of the BS 101. It means that the channel descriptor of the $RS_3$ 107 is the combination of the first common channel descriptor $C_{61}$ and the second common channel descriptor $C_{62}$. And in this example, a channel descriptor $CD_6$ of the MS 109 is not divided.

The first common channel descriptors $C_{61}$ of the $RS_1$ 103, the $RS_2$ 105, and the $RS_3$ 107 are the same, so that the transmitting module 1015 of the BS 101 can broadcast/multicast the first common channel descriptor only once to save the radio source. Further, the second common channel descriptors $C_{62}$ of the $RS_2$ 105 and the $RS_3$ 107 are the same, so that the transmitting module 1015 of the BS 101 can also broadcast/multicast the second common channel descriptor $C_{62}$ only once to save the radio source. After that, the particular channel descriptor $P_{61}$ of the $RS_1$ 103 will be transmitted to the $RS_1$ 103 and the particular channel descriptor $P_{62}$ of the $RS_2$ 105 will be transmitted to the $RS_2$ 105. Because the channel descriptor of the $RS_3$ 107 is the combination of the first common channel descriptor $C_{61}$ and the second common channel descriptor $C_{62}$, no particular channel descriptor of the $RS_3$ 107 is required to be transmitted. The channel descriptor $CD_6$ of the MS 109 is transmitted to the MS 109 by the transmitting module 1015 of the BS 101 directly.

Figure 8:
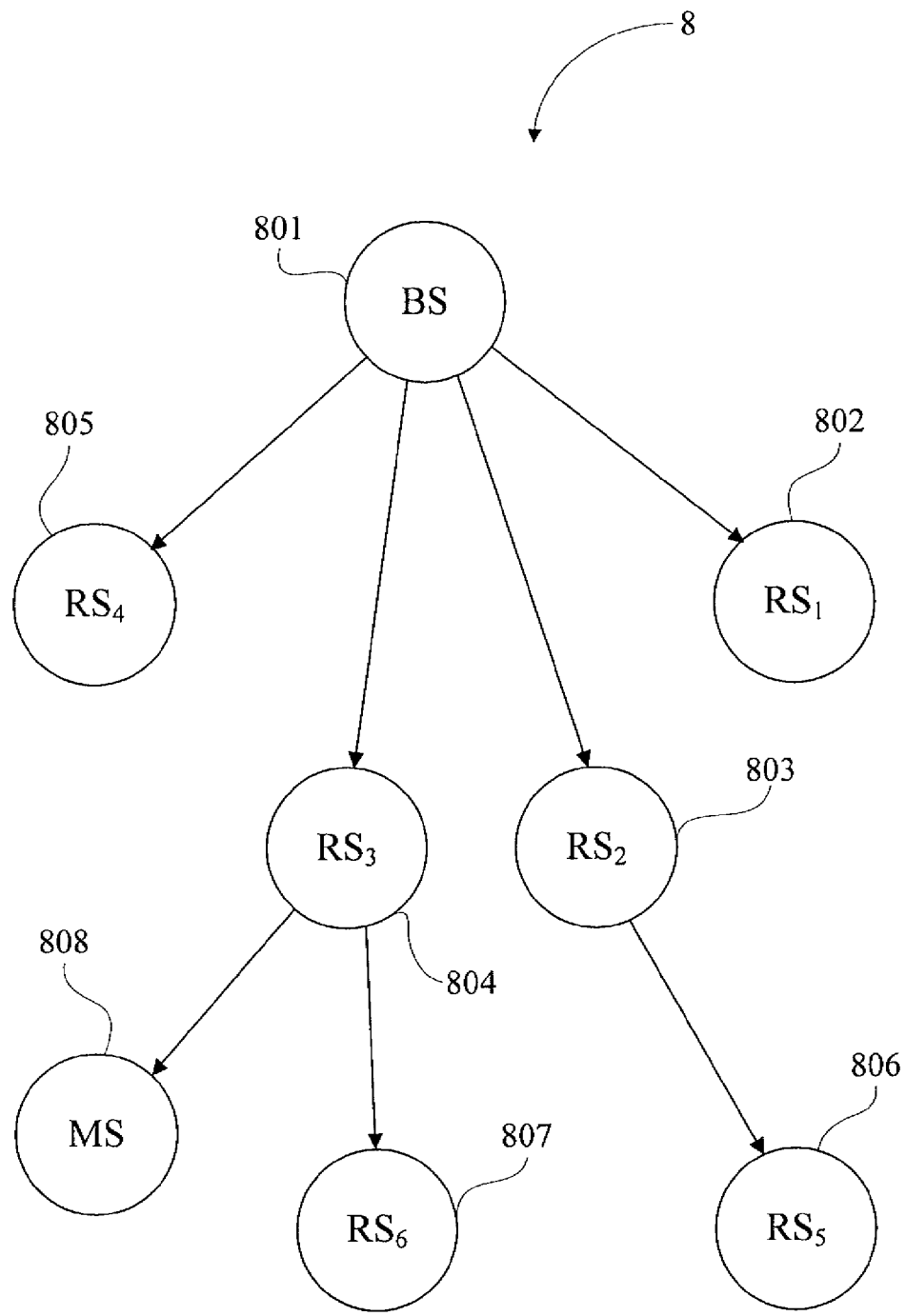
FIG. 8 illustrates a block diagram of a second embodiment of the present invention.
Figure 9:
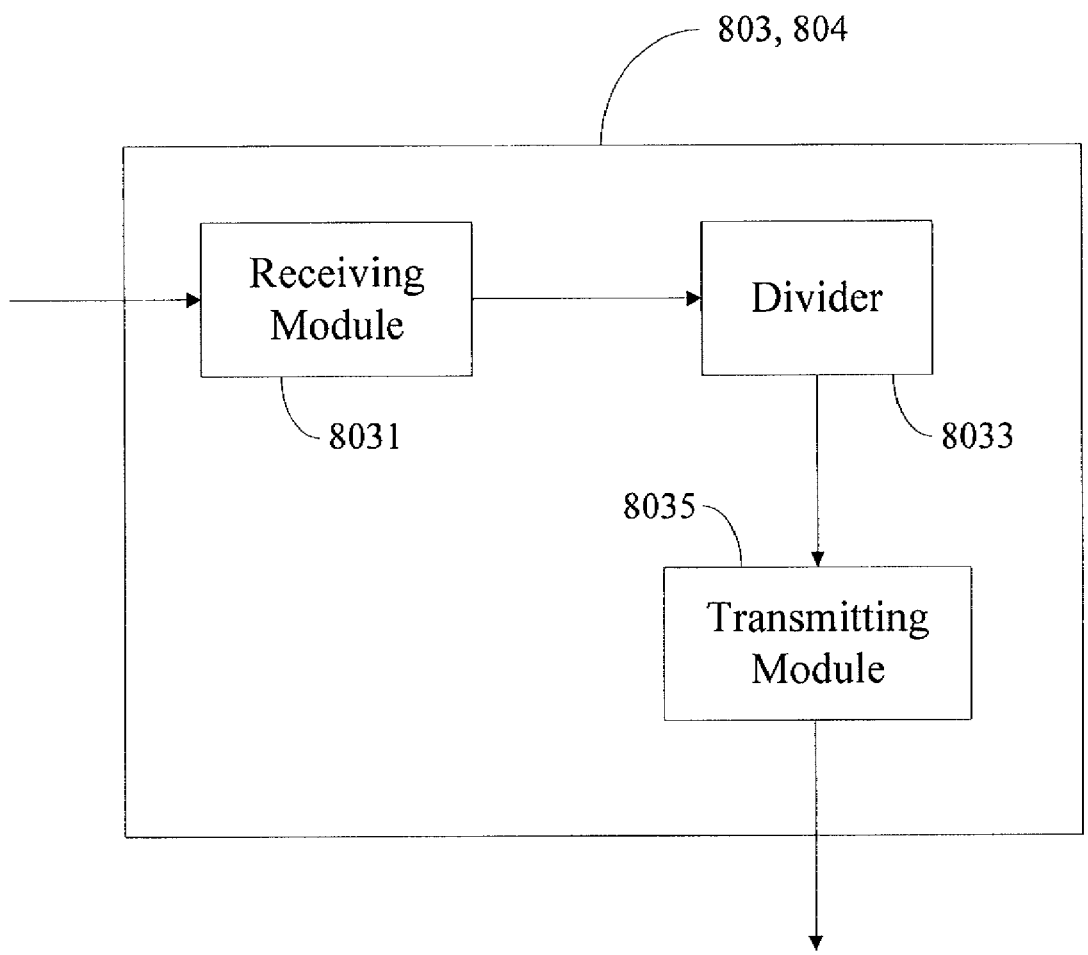
FIG. 9 illustrates a block diagram of an RS of the second embodiment.

As illustrated in FIG. 8, a second embodiment of the present invention is a multi-hop relay station system 8 based on a multi-hop relay standard, such as IEEE 802.16j standard. The multi-hop relay station system 8 comprises a BS 801, a plurality of RSs 802, 803, 804, 805, 806, 807, and an MS 808. In addition to the $RS_1$ 802 to the $RS_4$ 805 is described as the RSs of the first embodiment, the $RS_5$ 806 is connected to the $RS_2$ 803, the $RS_6$ 807 is connected to the $RS_3$ 804, and the MS 808 is also connected to the $RS_3$ 804. The BS 801 transmits channel descriptors of the $RS_1$ 802 to the $RS_4$ 805 in the same way as described in the second embodiment. The $RS_2$ 803 relays a channel descriptor of the $RS_5$ 806 transmitted by the BS 801 to $RS_5$ 806, while the $RS_3$ 804 relays channel descriptors of the $RS_6$ 807 and MS 808 transmitted by the BS 801 to the $RS_6$ 807 and MS 808 respectively. The BS 801 of the multi-hop relay station system 8 is described as the BS 101 of the two-hop relay station system 1. Thus, the detail of the BS 801 is not described here. The $RS_2$ 803 and $RS_3$ 804 of the multi-hop relay station system 8 which can relay a channel descriptor is illustrated in FIG. 9, which comprises a receiving module 8031, a processor 8033, and a transmitting module 8035.

Figure 10:
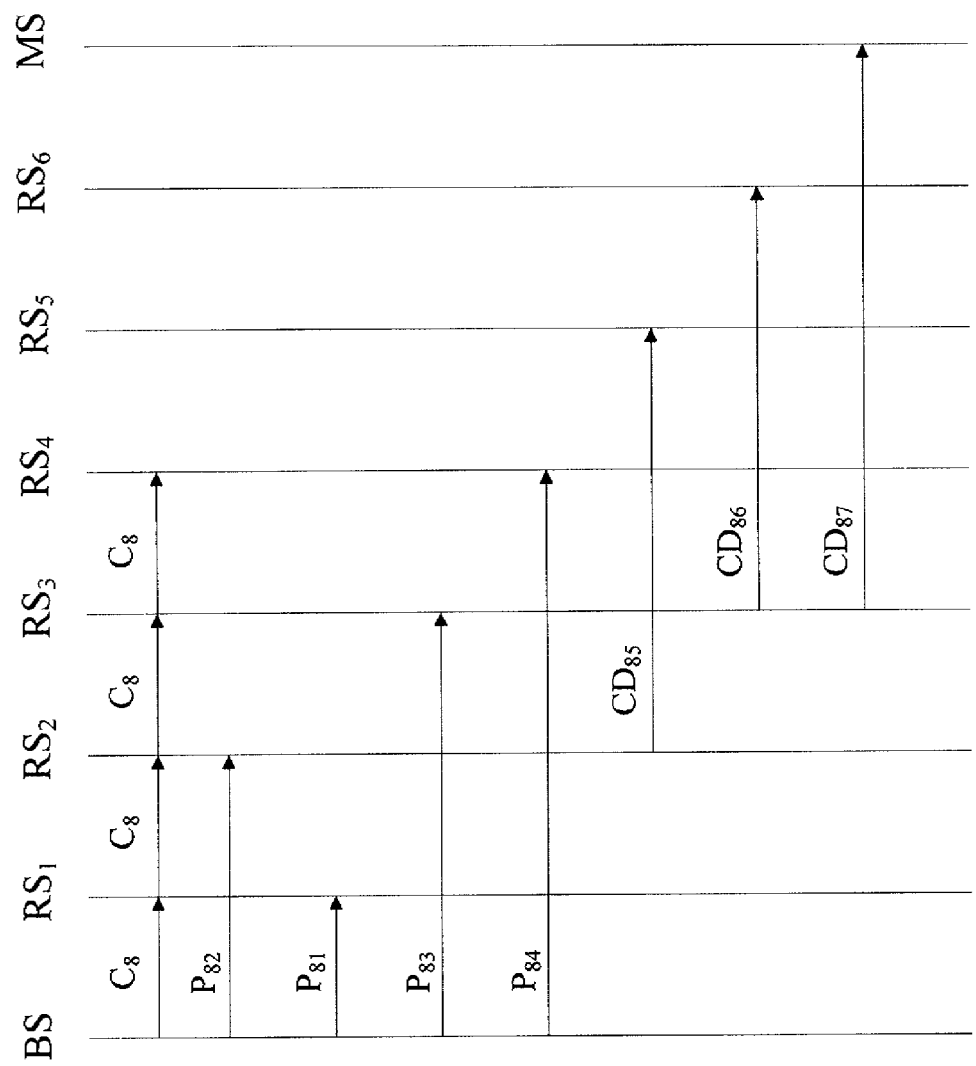
FIG. 10~FIG. 12 are diagrams of transmitting and relaying common channel descriptor and particular channel descriptors of the second embodiment.
Figure 11:
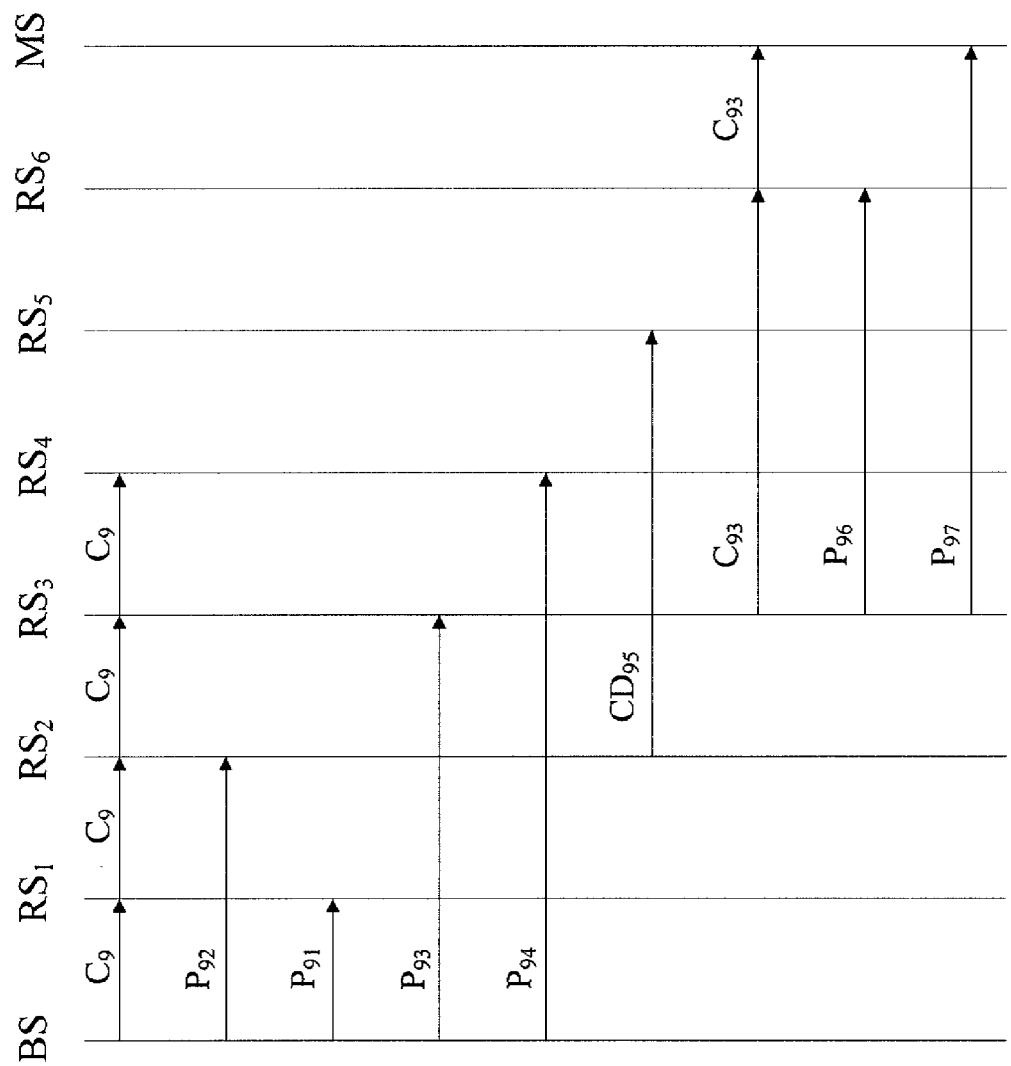
Figure 12:
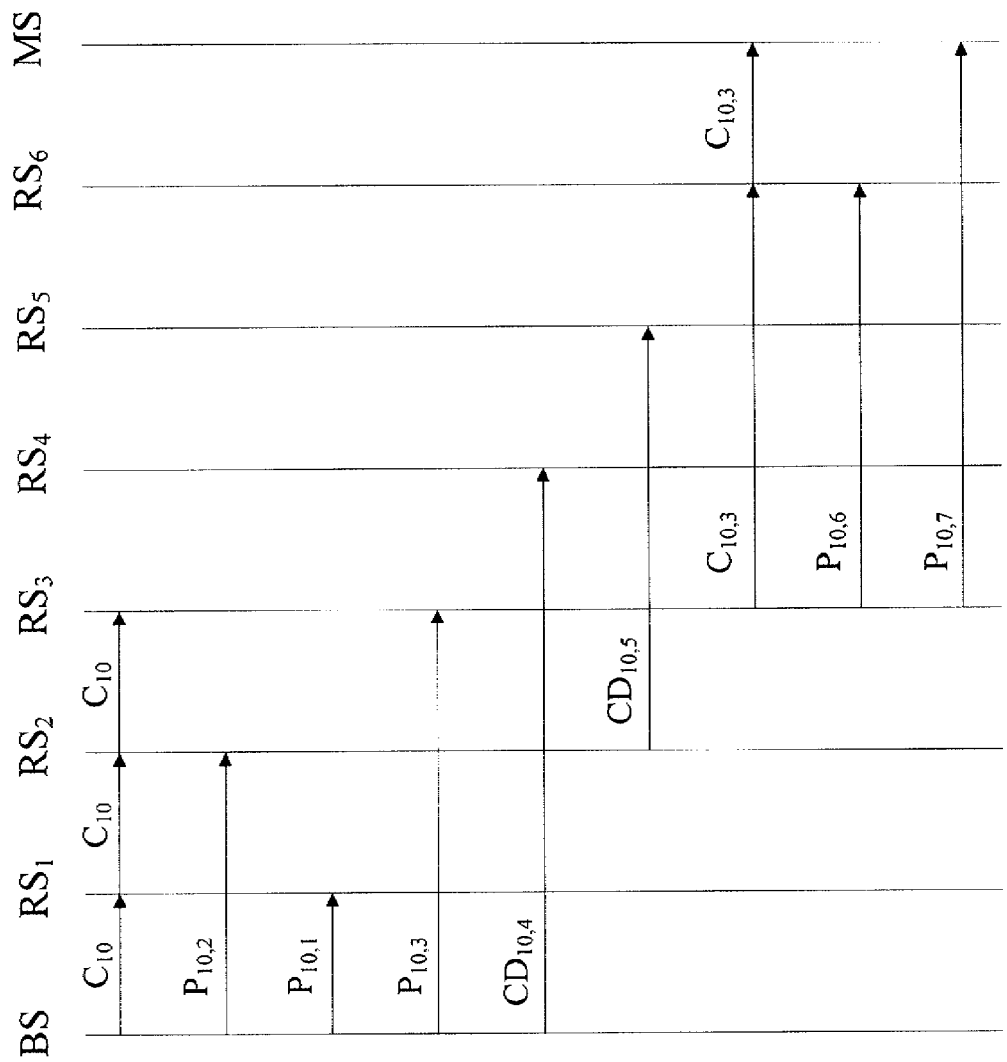

Some types of the transmitting and relaying of channel descriptors of the multi-hop relay station system 8 are illustrated in FIG. 10 to FIG. 12. As the same as the two-hop relay station system 1 based on a multi-hop relay standard of the first embodiment, the channel descriptors can be DCDs, UCDs, or combinations of the DCDs and the UCDs. Each of the common channel descriptors and the particular channel descriptors is scheduled by the BS 801 or one of the RSs 803, 804 which can relay channel descriptors, wherein each of the BS 801 and the RSs 803, 804 has a scheduling algorithm to accomplish this operation. Furthermore, each of the RSs 803, 804 which can relay channel descriptors also has a transfer function, wherein the transfer function is used to collect common channel descriptors and the particular channel descriptors and to relay the collected common channel descriptors and the particular channel descriptors to other apparatuses.

As shown in FIG. 10 to FIG. 12, the $RS_2$ 803 can relay the channel descriptor of the $RS_5$ 806 transmitted by the BS 801 to $RS_5$ 806. The $RS_3$ 804 can relay the channel descriptors of the $RS_6$ 807 and the MS 808 transmitted by the BS 801 to the $RS_6$ 807 and the MS 808 respectively. The relays are achieved by transfer functions of the $RS_2$ 803 and the $RS_3$ 804. To be more specific, in FIG. 10, the BS 801 broadcasts/multicasts the common channel descriptors $C_8$ among $RS_1$ 802, $RS_2$ 803, $RS_3$ 804, and $RS_4$ 805 to the $RS_1$ 802, $RS_2$ 803, $RS_3$ 804, and $RS_4$ 805. Then, the BS 801 transmits the particular channel descriptor $P_{81}$ of $RS_1$ 802 to the $RS_1$ 802, the particular channel descriptor $P_{82}$ of $RS_2$ 803 to the $RS_2$ 803, the particular channel descriptor $P_{83}$ of $RS_3$ 804 to the $RS_3$ 804, and the particular channel descriptor $P_{84}$ of $RS_4$ 805 to the $RS_4$ 805.

Furthermore, the receiving module 8031 of the $RS_2$ 803 receives the common channel descriptors $C_8$ and the particular channel descriptor $P_{82}$ first. Then the processor 8033 of the $RS_2$ 803 combines the common channel descriptor $C_8$ and the particular channel descriptor $P_{82}$ to generate a channel descriptor $CD_{85}$. Finally, the transmitting module 8035 of the $RS_2$ 803 relays the channel descriptor $CD_{85}$ of the $RS_5$ 806 transmitted by the BS 801 to $RS_5$ 806, wherein the channel descriptor $CD_{85}$ is added in the common channel descriptors $C_8$ and/or the particular channel descriptor $P_{82}$. In the same way, the transmitting module 8035 of the $RS_3$ 804 relays channel descriptors $CD_{86}$ and $CD_{87}$ of the $RS_6$ 807 and MS 808 transmitted by the BS 801 to the $RS_6$ 807 and MS 808 respectively, wherein the channel descriptors $CD_{86}$ and $CD_{87}$ are added in the common channel descriptors $C_8$ and/or the particular channel descriptor $P_{83}$ by the processor 8033 of the $RS_3$ 804.

In FIG. 11, the BS 801 broadcasts/multicasts the common channel descriptors $C_9$ among $RS_1$ 802, $RS_2$ 803, $RS_3$ 804, and $RS_4$ 805 to the $RS_1$ 802, $RS_2$ 803, $RS_3$ 804, and $RS_4$ 805. Then, the BS 801 transmits the particular channel descriptor $P_{91}$ of $RS_1$ 802 to the $RS_1$ 802, the particular channel descriptor $P_{92}$ of $RS_2$ 803 to the $RS_2$ 803, the particular channel descriptor $P_{93}$ of $RS_3$ 804 to the $RS_3$ 804, and the particular channel descriptor $P_{94}$ of $RS_4$ 805 to the $RS_4$ 805.

Furthermore, the receiving module 8031 of the $RS_2$ 803 receives the common channel descriptors $C_9$ and the particular channel descriptor $P_{92}$ first. Then the processor 8033 of the $RS_2$ 803 combines the common channel descriptor $C_9$ and the particular channel descriptor $P_{92}$ to generate a channel descriptor $CD_{95}$. Finally, the transmitting module 8035 of the $RS_2$ 803 relays the channel descriptor $CD_{95}$ of the $RS_5$ 806 transmitted by the BS 801 to $RS_5$ 806, wherein the channel descriptor $CD_{95}$ is added in the common channel descriptors $C_9$ and/or the particular channel descriptor $P_{92}$.

The receiving module 8031 of the $RS_3$ 804 receives the common channel descriptors $C_9$ and the particular channel descriptor $P_{93}$ first. The processor 8033 of the $RS_3$ 804 combines the common channel descriptor $C_9$ and the particular channel descriptor $P_{93}$ to generate a channel descriptor $CD_{96}$ (not shown). Then, the processor 8033 of the $RS_3$ 804 finds the same information of the channel descriptors of the $RS_6$ 807 and MS 808 first. The channel descriptor of the $RS_6$ 807 is divided into a common channel descriptor $C_{93}$ and a particular channel descriptor $P_{96}$ of the $RS_6$ 807 by the processor 8033 of the $RS_3$ 804 according to the same information of the $RS_6$ 807 and MS 808. The channel descriptor of the MS 808 is divided into a common channel descriptor $C_{93}$ and a particular channel descriptor $P_{97}$ of the MS 808 by the processor 8033 of the $RS_3$ 804 according to the same information of the $RS_6$ 807 and MS 808. Finally, the transmitting module 8035 of the $RS_3$ 804 relays the common channel descriptor $C_{93}$ to the $RS_6$ 807 and MS 808 respectively, transmits the particular channel descriptor $P_{96}$ to the $RS_6$ 807, and transmits the particular channel descriptor $P_{97}$ to the MS 808.

In FIG. 12, the BS 801 transmits the common channel descriptors $C_{10}$ among $RS_1$ 802, $RS_2$ 803, and $RS_3$ 804 to the $RS_1$ 802, $RS_2$ 803, and $RS_3$ 804. Then, the BS 801 transmits the particular channel descriptor $P_{10,1}$ of $RS_1$ 802 to the $RS_1$ 802, the particular channel descriptor $P_{10,2}$ of $RS_2$ 803 to the $RS_2$ 803, and the particular channel descriptor $P_{10,3}$ of $RS_3$ 804 to the $RS_3$ 804. Since the $RS_4$ 805 does not have common channel descriptor, the BS 801 transmits the channel descriptor $CD_{10,4}$ of $RS_4$ 805 to the $RS_4$ 805 directly.

The $RS_2$ 803 and $RS_3$ 804 can relay channel descriptors as description of FIG. 11. The $RS_2$ 803 relays a channel descriptor $CD_{10,5}$ of the $RS_5$ 806 transmitted by the BS 801 to $RS_5$ 806, wherein the channel descriptor $CD_{10,5}$ is added in the common channel descriptors $C_{10}$ and/or the particular channel descriptor $P_{10,2}$. The $RS_3$ 804 finds the same information of the channel descriptors of the $RS_6$ 807 and MS 808 first. The channel descriptor of the $RS_6$ 807 is divided into a common channel descriptor $C_{10,3}$ and a particular channel descriptor $P_{10,6}$ of the $RS_6$ 807 by the $RS_3$ 804 according to the same information of the $RS_6$ 807 and MS 808. The channel descriptor of the MS 808 is divided into a common channel descriptor $C_{10,3}$ and a particular channel descriptor $P_{10,7}$ of the MS 808 by the $RS_3$ 804 according to the same information of the $RS_6$ 807 and MS 808. The $RS_3$ 804 relays the common channel descriptor $C_{10,3}$ and particular channel descriptors $P_{10,6}$ and $P_{10,7}$ of the $RS_6$ 807 and MS 808 transmitted by the BS 801 to the $RS_6$ 807 and MS 808 respectively.

In addition to the operations depicted in the second embodiment as shown in FIG. 10 to FIG. 12, the second embodiment can also execute all the operations of the first embodiment. Those skilled in the art can understand the corresponding steps or operations of the second embodiment, such as the transmitting of channel descriptors of the $RS_3$ or the $RS_6$ by following the descriptions of transmitting channel descriptors of the first embodiment, and thus, no necessary detail is given further.

Figure 13:
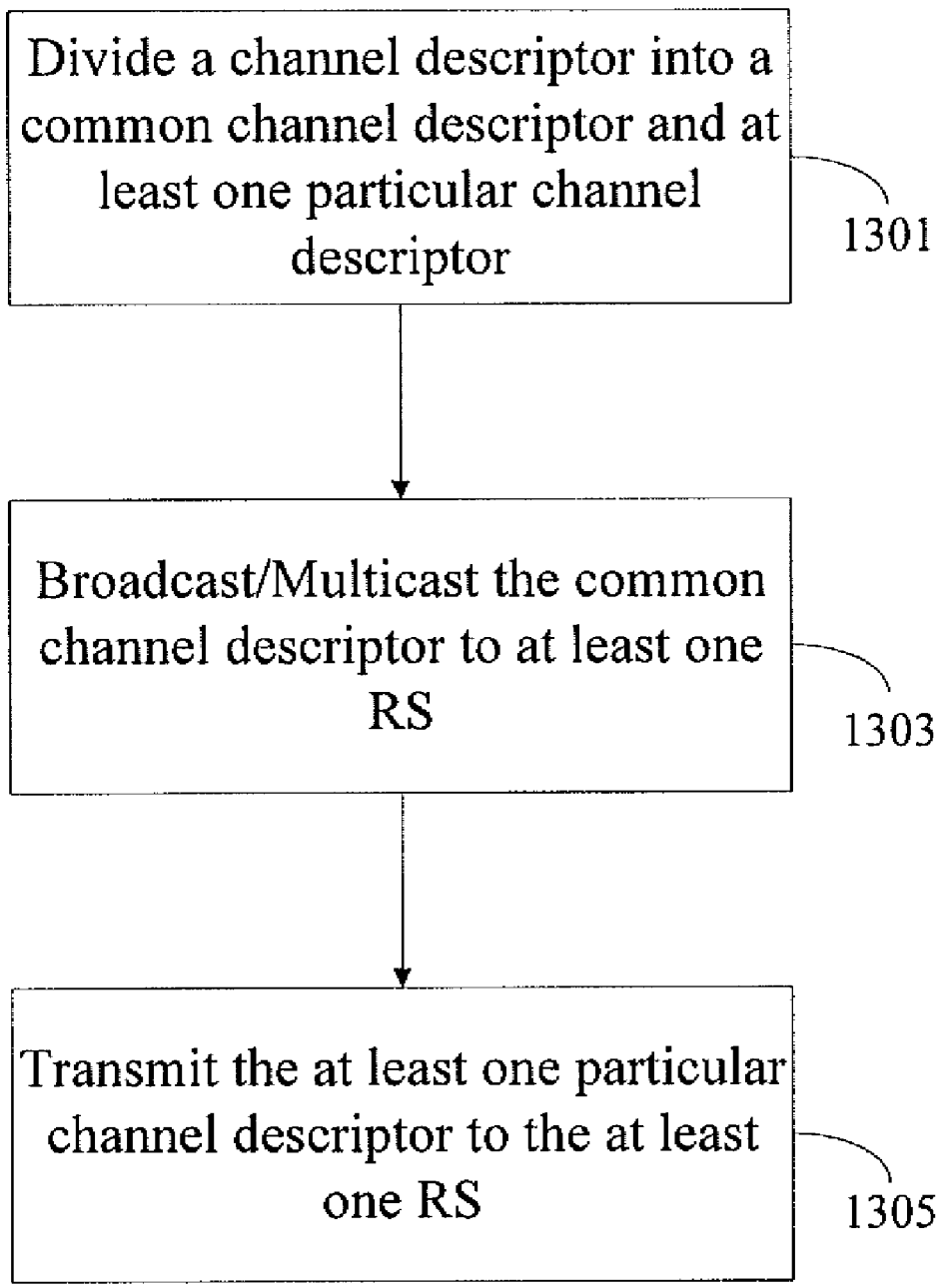
FIG. 13 is a flow chart illustrating a third embodiment of the present invention.

The third embodiment of this invention is a method for transmitting a channel descriptor based on a multi-hop relay standard, which is a method applied to the two-hop relay wireless communication system 1 described in the first embodiment. More specifically, the data transmission method of the third embodiment which is illustrated in FIG. 13 can be implemented by an application program controlling various modules of a wireless communication apparatus in the two-hop relay wireless communication system 1. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 1301, a channel descriptor is divided into a common channel descriptor and at least one particular channel descriptor by a BS in the two-hop relay wireless communication system 1, such as the BS 101. Next in step 1303, the common channel descriptor is broadcasted/multicasted from the BS 101 to at least one RS in the two-hop relay wireless communication system 1, such as the $RS_2$ 105. Finally in step 1305, the at least one particular channel descriptor is transmitted from the BS to the at least one RS.

In addition to the steps revealed in FIG. 13, the third embodiment can also execute all the operations of the first embodiment, in which those skilled in the art can understand the corresponding steps and operations of the third embodiment by the explanation of the first embodiment, and thus no necessary detail is given.

Figure 14:
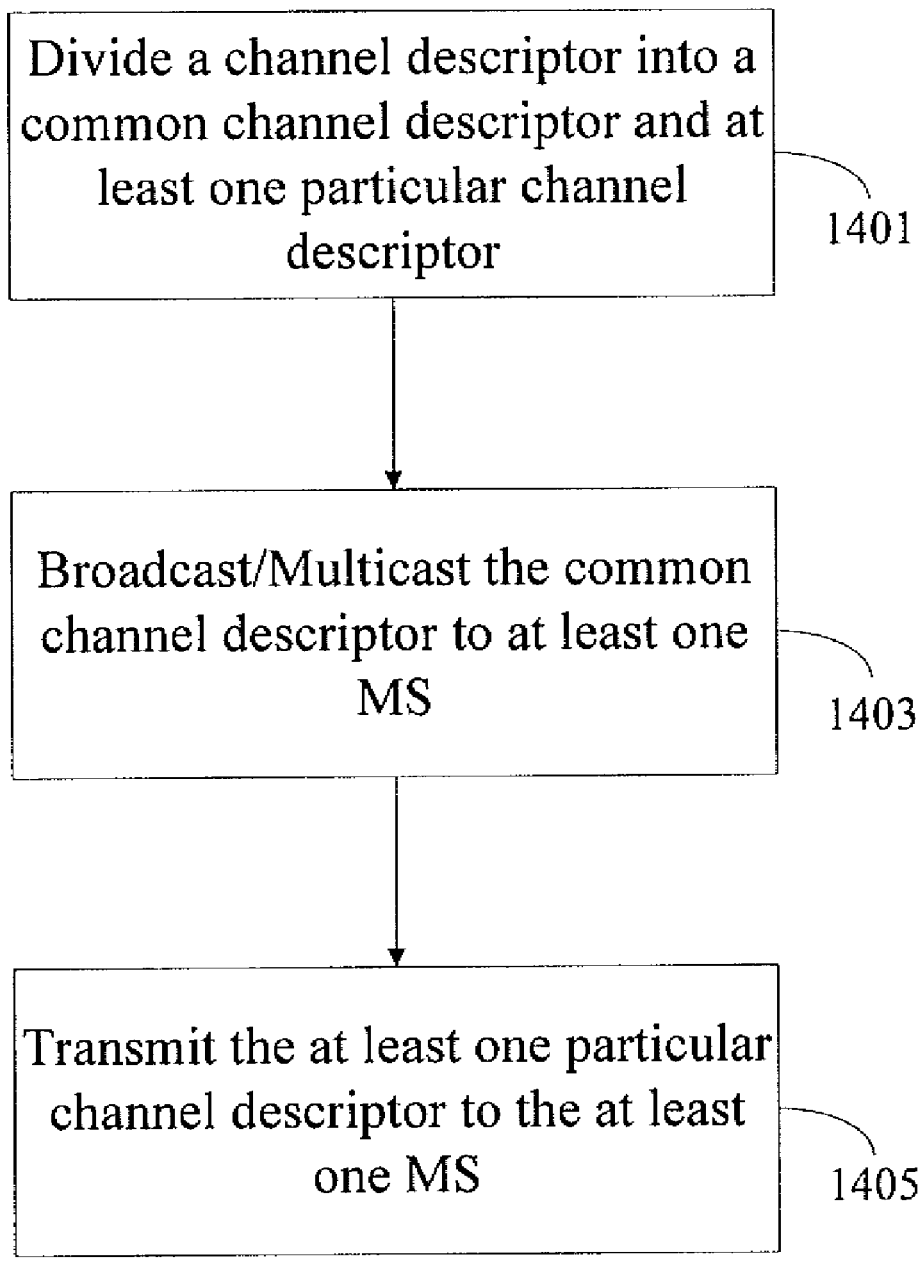
FIG. 14 is a flow chart illustrating a fourth embodiment of the present invention.

A fourth embodiment of this invention is another method for transmitting a channel descriptor based on a multi-hop relay standard, which is a method applied to the two-hop relay wireless communication system 1 described in the first embodiment. More specifically, the data transmission method of the fourth embodiment which is illustrated in FIG. 14 can be implemented by an application program controlling various modules of a wireless communication apparatus in the two-hop relay wireless communication system 1. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 1401, a channel descriptor is divided into a common channel descriptor and at least one particular channel descriptor by a BS in the two-hop relay wireless communication system 1, such as the BS 101. Next in step 1403, the common channel descriptor is broadcasted/multicasted from the BS 101 to at least one MS in the two-hop relay wireless communication system 1, such as the MS 109. Finally in step 1405, the at least one particular channel descriptor is transmitted from the BS to the at least one MS.

In addition to the steps revealed in FIG. 14, the fourth embodiment can also execute all the operations of the first embodiment, in which those skilled in the art can understand the corresponding steps and operations of the fourth embodiment by the explanation of the first embodiment, and thus no necessary detail is given.

Figure 15:
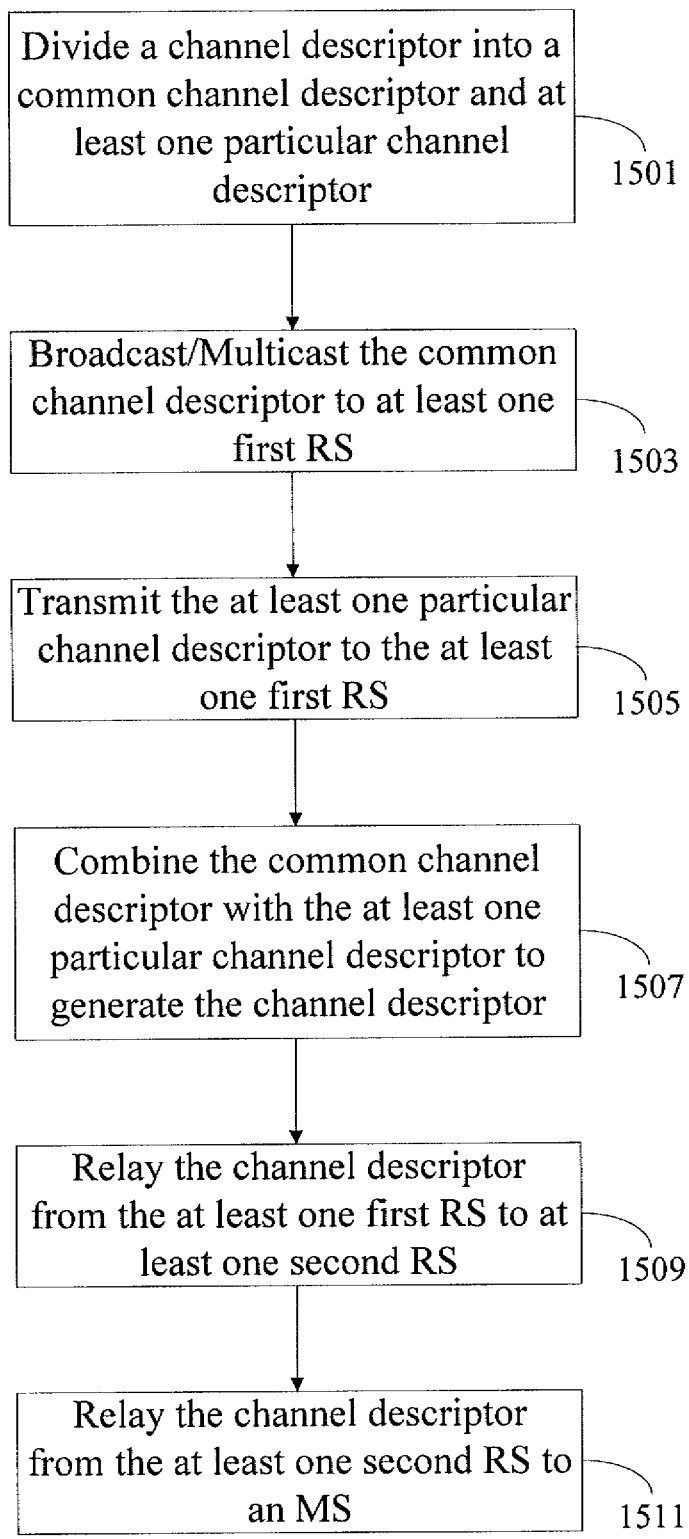
FIG. 15 is a flow chart illustrating a fifth embodiment of the present invention.

A fifth embodiment of this invention is another method for transmitting a channel descriptor based on a multi-hop relay standard, which is a method applied to the multi-hop relay wireless communication system 8 described in the second embodiment. More specifically, the data transmission method of the fifth embodiment which is illustrated in FIG. 15 can be implemented by an application program controlling various modules of a wireless communication apparatus in the multi-hop relay wireless communication system 8. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 1501, a channel descriptor is divided into a common channel descriptor and at least one particular channel descriptor by a BS in the multi-hop relay wireless communication system 8, such as the BS 801. Next in step 1503, the common channel descriptor is broadcasted/multicasted from the BS 801 to at least one first RS in the multi-hop relay wireless communication system 8, such as the $RS_3$ 804. In step 1505, the at least one particular channel descriptor is transmitted from the BS to the at least one first RS. In step 1507, the common channel descriptor is combined with the at least one particular channel descriptor to generate the channel descriptor. In the step 1509, the channel descriptor is relayed from the at least one first RS to at least one second RS in the multi-hop relay wireless communication system 8, such as the $RS_6$ 807. Finally, in step 1511, the channel descriptor is relayed from the at least one second RS to an MS.

In addition to the steps revealed in FIG. 15, the fifth embodiment can also execute all the operations of the second embodiment, in which those skilled in the art can understand the corresponding steps and operations of the fifth embodiment by the explanation of the second embodiment, and thus no necessary detail is given.

Accordingly, by dividing a channel descriptor into a common channel descriptor and at least one particular channel descriptor, transmitting, such as broadcasting or multicasting, the common channel descriptor to a plurality of RSs, and transmitting the at least one particular channel descriptor to one of the RSs, this invention can transmit and relay the channel descriptor to each RS and MS of the wireless communication system based on a multi-hop relay standard.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for transmitting a channel descriptor of a first relay station (RS) based on a multi-hop relay standard, comprising the steps of:
   finding a piece of same information between the channel descriptor of the first RS and a channel descriptor of a second RS;
   dividing the channel descriptor of the first RS into a common channel descriptor and a particular channel descriptor according to the piece of same information;
   transmitting the common channel descriptor from a base station (BS) to the first RS; and
   transmitting the particular channel descriptor from the BS to the first RS.

2. The method as claimed in claim 1, further comprising the steps of:
   combining the common channel descriptor with the particular channel descriptor to generate the channel descriptor; and
   relaying the channel descriptor from the first RS to at least one mobile station (MS).

3. The method as claimed in claim 1, further comprising the steps of:
   combining the common channel descriptor with the particular channel descriptor to generate the channel descriptor; and
   relaying the channel descriptor from the first RS to a third RS.

4. The method as claimed in claim 3, further comprising the step of relaying the channel descriptor from the third RS to at least one MS.

5. The method as claimed in claim 1, further comprising the steps of:
   transmitting the common channel descriptor from the BS to at least one MS; and
   transmitting the particular channel descriptor from the BS to the at least one MS.

6. The method as claimed in claim 5, further comprising the step of combining the common channel descriptor with the particular channel descriptor to generate the channel descriptor.

7. A wireless communication system based on a multi-hop relay standard, comprising:
   a first RS;
   a second RS; and
   a BS for finding a piece of same information between a channel descriptor of the first RS and a channel descriptor of a second RS and for dividing the channel descriptor of the first RS into a common channel descriptor and a particular channel descriptor according to the piece of the same information;
   wherein the BS transmits the common channel descriptor to the first RS, and transmits the particular channel descriptor to the same.

8. The wireless communication system as claimed in claim 7, further comprising:
   at least one MS;
   wherein the first RS combines the common channel descriptor with the particular channel descriptor to generate the channel descriptor, and relays the channel descriptor to the at least one MS.

9. The wireless communication system as claimed in claim 7, further comprising:
   a third RS;
   wherein the first RS combines the common channel descriptor with the particular channel descriptor to generate the channel descriptor, and relays the channel descriptor to the third RS.

10. The wireless communication system as claimed in claim 9, further comprising:
    at least one MS;
    wherein the third RS relays the channel descriptor to the at least one MS.

11. The wireless communication system as claimed in claim 7, further comprising:
    at least one MS;
    wherein the BS transmits the common channel descriptor to the at least one MS, and transmits the particular channel descriptor to the same.

12. The wireless communication system as claimed in claim 11, wherein the at least one MS combines the common channel descriptor with the particular channel descriptor to generate the channel descriptor.

13. The wireless communication system as claimed in claim 11, wherein the multi-hop relay standard is IEEE 802.16j standard.

14. A tangible machine-readable medium having executable code to cause a machine to perform a method for transmitting a channel descriptor of a first RS based on a multi-hop relay standard, the method comprising steps of:
    finding a piece of same information between the channel descriptor of the first RS and a channel descriptor of a second RS;
    dividing the channel descriptor of the first RS into a common channel descriptor and a particular channel descriptor according to the piece of same information;
    transmitting the common channel descriptor from a BS to the first RS; and
    transmitting the particular channel descriptor from the BS to the first RS.

15. The tangible machine-readable medium as claimed in claim 14, wherein the method further comprises the steps of:
    combining the common channel descriptor with the particular channel descriptor to generate the channel descriptor; and
    relaying the channel descriptor from the first RS to at least one MS.

16. The tangible machine-readable medium as claimed in claim 14, wherein the method further comprises the steps of:
    combining the common channel descriptor with the particular channel descriptor to generate the channel descriptor; and
    relaying the channel descriptor from the first RS to a third RS.

17. The tangible machine-readable medium as claimed in claim 16, wherein the method further comprises the step of relaying the channel descriptor from the third RS to at least one MS.

18. The tangible machine-readable medium as claimed in claim 14, wherein the method further comprises the steps of
    transmitting the common channel descriptor from the BS to at least one MS; and
    transmitting the particular channel descriptor from the BS to the at least one MS.

19. The tangible machine-readable medium as claimed in claim 18, wherein the method further comprises the step of combining the common channel descriptor with the particular channel descriptor to generate the channel descriptor.

20. A communication apparatus based on a multi-hop relay standard, comprising:

a divider for finding a piece of same information between a channel descriptor of a first RS and a channel descriptor of a second RS and for dividing the channel descriptor of the first RS into a common channel descriptor and a particular channel descriptor according to the piece of same information; and a transmitting module for transmitting the common channel descriptor to the first RS and transmitting the particular channel descriptor to the same.

21. The communication apparatus as claimed in claim 20, wherein the transmitting module transmits the common channel descriptor to at least one MS and transmits the particular channel descriptor to the same.

22. A communication apparatus for relaying a channel descriptor based on a multi-hop relay standard, comprising:

a receiving module for receiving a common channel descriptor and a particular channel descriptor from a BS, wherein the common channel descriptor and the particular channel descriptor are divided from the channel descriptor according to a same information between the channel descriptor and another channel descriptor; and a processor for combining the common channel descriptor and the particular channel descriptor to generate the channel descriptor; and a transmitting module for relaying the channel descriptor to one of at least one RS and at least one MS.

* * * * *